United States Patent
Chen et al.

(10) Patent No.: US 10,210,200 B2
(45) Date of Patent: Feb. 19, 2019

(54) ACTION-BASED ROUTING OF A TRANSACTION IN AN ONLINE TRANSACTION PROCESSING SYSTEM

(71) Applicant: Futurewei Technologies, Inc., Plano, TX (US)

(72) Inventors: Mengmeng Chen, San Jose, CA (US); Aniket Adnaik, Sunnyvale, CA (US); Praburam Upendran, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 612 days.

(21) Appl. No.: 14/873,070

(22) Filed: Oct. 1, 2015

(65) Prior Publication Data

US 2017/0097955 A1 Apr. 6, 2017

(51) Int. Cl.
*G06F 7/00* (2006.01)
*G06F 17/30* (2006.01)
*G06F 13/14* (2006.01)

(52) U.S. Cl.
CPC .. *G06F 17/30377* (2013.01); *G06F 17/30445* (2013.01); *G06F 17/30486* (2013.01); *G06F 17/30545* (2013.01)

(58) Field of Classification Search
CPC ......... G06F 17/30575; G06F 17/30315; G06F 17/30377; G06F 17/30312; G06F 17/30477; G06F 17/30595; G06F 17/30038; G06F 17/30283; G06F 17/30327; G06F 17/30483; G06F 17/30498; G06F 17/30551; G06F 17/30445; G06F 17/30864
USPC ..... 707/E17.005, E17.032, 999.01, 999.004, 707/E17.001, 607, 626, 706, 722, 707/999.001, 999.002, 999.005, 999.008, 707/999.101, 999.102, 999.1
See application file for complete search history.

(56) References Cited

U.S. PATENT DOCUMENTS

| | | | |
|---|---|---|---|
| 7,430,570 B1 * | 9/2008 | Srinivasan | ........ G06F 17/30094 |
| 2005/0283522 A1 | 12/2005 | Parkkinen et al. | |
| 2010/0082540 A1 | 4/2010 | Isaacson et al. | |
| 2013/0046937 A1 | 2/2013 | Heller, Jr. | |

(Continued)

FOREIGN PATENT DOCUMENTS

| | | |
|---|---|---|
| CN | 101788922 | 7/2010 |
| CN | 102483704 | 5/2012 |

OTHER PUBLICATIONS

"International Application No. PCT/CN2016/100413, International Search Report dated Nov. 29, 2016", (Nov. 29, 2016), 4 pgs.

(Continued)

*Primary Examiner* — Syling Yen
*Assistant Examiner* — Cecile H Vo
(74) *Attorney, Agent, or Firm* — Schwegman Lundberg & Woesner, P.A.

(57) ABSTRACT

A request to perform a transaction on a database in an online transaction processing system is accessed by a node. The sets of data in the database that the transaction is to act on are determined. The transaction is then separated into actions according to the data dependencies of the actions; an action is established for each set of data that is acted on by the transaction. The actions are communicated to the nodes that store the data that the respective actions depend on. The actions are then performed on the nodes to which they were routed.

18 Claims, 7 Drawing Sheets

(56) References Cited

U.S. PATENT DOCUMENTS

| | | |
|---|---|---|
| 2013/0219121 A1 | 8/2013 | Wang |
| 2014/0032528 A1 | 1/2014 | Mandre et al. |
| 2014/0280021 A1 | 9/2014 | Singamshetty |
| 2015/0089134 A1* | 3/2015 | Mukherjee ............ G06F 15/78 711/114 |
| 2015/0261563 A1* | 9/2015 | Guerin .................. G06F 9/466 707/703 |
| 2016/0350392 A1* | 12/2016 | Rice ................ G06F 17/30339 |

OTHER PUBLICATIONS

"European Application Serial No. 16850335.7, Extended European Search Report dated Jul. 26, 2018", 7 pgs.

Nikolaou, C. N., et al., "Transaction Routing for Distributed OLTP Systems: Survey and Recent Results", [online]. Retrieved from the Internet: <URL: http://citeseerx.ist.psu.edu/viewdoc/download?doi=10.1.1.46.3347&rep=rep1&type=pdf>, (Mar. 1997), 26 pgs.

* cited by examiner

ACTION-BASED ROUTING OF A TRANSACTION IN AN ONLINE TRANSACTION PROCESSING SYSTEM

BACKGROUND

Online transaction processing (OLTP) is used to facilitate the storage, retrieval, and maintenance of transactional data (e.g., transaction-related data). OLTP is used in industries (such as banks, airlines, and retailers) that rely heavily on the efficient processing of a large number of client transactions. Database systems that support OLTP are usually distributed across multiple servers to avoid single points of failure and to spread the volume of data and traffic.

The demands associated with high-throughput OLTP databases and systems are growing dramatically with the explosion in the amount of data and the introduction of new types of transactions. Traditional, smaller transactions are giving way to larger and more complex transactions due to the increased complexity of business models.

Some contemporary OLTP systems attempt to improve performance by exploiting inter-transaction parallelism. These types of systems schedule multiple worker threads to execute concurrently, with each thread running a complete transaction on its own. However, there can be problems with these types of systems, such as poor instruction-data locality; that is, a thread executing on one server may need to act on data that resides on other servers. To reach that data, the thread sends database queries in the form of, for example, a Structured Query Language (SQL) statement to the servers, which generate executable code for each query and then execute the query. The tasks of compiling the query, generating an execution plan, and executing the query increase overhead. Another problem with these types of systems is that different threads, performing different transactions, may attempt to access the same data at the same time. As a result, large numbers of lock and latch conflicts can occur, resulting in poor performance and poor scalability.

Other contemporary OLTP systems attempt to improve performance by exploiting intra-transaction parallelism. These types of systems run each query in a transaction on parallel execution engines using, for example, SQL statements. Problems with these types of systems also include poor instruction-data locality and increased overhead as described above, as well as difficulties with profiling system performance.

SUMMARY

In overview, in embodiments according to the present invention, a transaction is divided into a set of actions according to the data used by the actions, and each of those actions is then communicated to and executed by nodes that hold the set of data that the action is to act on. Instead of coupling a thread with a transaction as described above, a thread is coupled with a set of data. Thus, instead of bringing data from distributed nodes to a transaction, the transaction is divided into actions that are individually routed to the nodes that store the data.

In general, a node may be a device (e.g., a server), or a node may be instantiated on a device with other nodes (e.g., multiple nodes may be implemented on a single device). The data is logically and physically partitioned into sets of data that reside on or are managed by different nodes (referred to herein as "execution nodes"). In an embodiment, the sets are disjoint sets.

In an embodiment, a request to perform a transaction on a database in an online transaction processing system (OLTP) is accessed or received by a node (referred to herein as a "routing node"). The routing node determines which sets of data in the database the transaction is to act on. For example, the transaction may act on a first set of data on a first node (a first execution node), and may also act on a second set of data on a second node (a second execution node).

The transaction is then separated into actions according to the data dependencies of the transaction. In other words, an action is established for each set of data that is to be acted on by the transaction. For example, if the transaction will act on two sets of data, then the transaction can be separated into a first action and a second action, where the first action is associated with the first set of data and the second action is associated with the second set of data. In an embodiment, the actions are DML (Data Manipulation Language) actions (actions that are specified using the DML syntax). An action may also be known as a statement, query, expression, or command.

The actions are then separately communicated by the routing node to the nodes (the execution nodes) that store the data that the respective actions are to act on. For example, an action-specific message for the first action can be sent to the first execution node (which stores the first set of data to be acted on by the first action), and an action-specific message for the second action can be sent to the second execution node (which stores the second set of data to be acted on by the second action). The actions are then performed by the execution nodes to which the actions were routed. The actions can be performed concurrently, in parallel. For example, the first execution node performs the first action on the first set of data and, in the same time frame, the second execution node performs the second action on the second set of data.

In an embodiment, each action is communicated to a first thread (referred to herein as a "receiving thread") that executes on the execution node to which the action has been routed. For example, the first action is communicated to a receiving thread that executes on the first execution node. The first (receiving) thread then delegates the action to an action-specific second thread (referred to herein as an "agent thread") that executes on the same execution node. The second (agent) thread enqueues the action, and can send a message to the first thread when the action is enqueued. The second thread can also request and invoke a lock on the set of data to be acted on by the action. The second thread can notify the first thread when the action is completed by sending a message to the first thread, which in turn can notify the routing node.

Each execution node performing an action as part of the transaction notifies the routing node when the action is completed. For example, the first execution node can notify the routing node when the first action is completed, and the second execution node can notify the routing node when the second action is completed.

In response to being notified that the actions (e.g., both the first and second actions) have been completed, the routing node can schedule and initiate the next (following) action or set of actions associated with the transaction. The next action can be, for example, a synchronization action to synchronize the actions just completed, or it can be another action (e.g., another DML action) that acts on the database in the OLTP system. Once all actions associated with the transaction have been completed, a commit operation (that instructs the execution nodes to commit completed actions to the database) can be performed.

To summarize, embodiments according to the present invention utilize a data-oriented transaction processing model to increase OLTP throughput using intra-transaction parallelism along with inter-transaction parallelism. The probability of conflicts can be reduced, and global locking that is commonly a bottleneck in high-throughput OLTP systems can be avoided. Instruction-data locality, the ability to profile system performance, and system scalability are improved. Action-based routing reduces the overhead associated with database queries (e.g., SQL statements) and their execution, thus decreasing network traffic and increasing network bandwidth.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
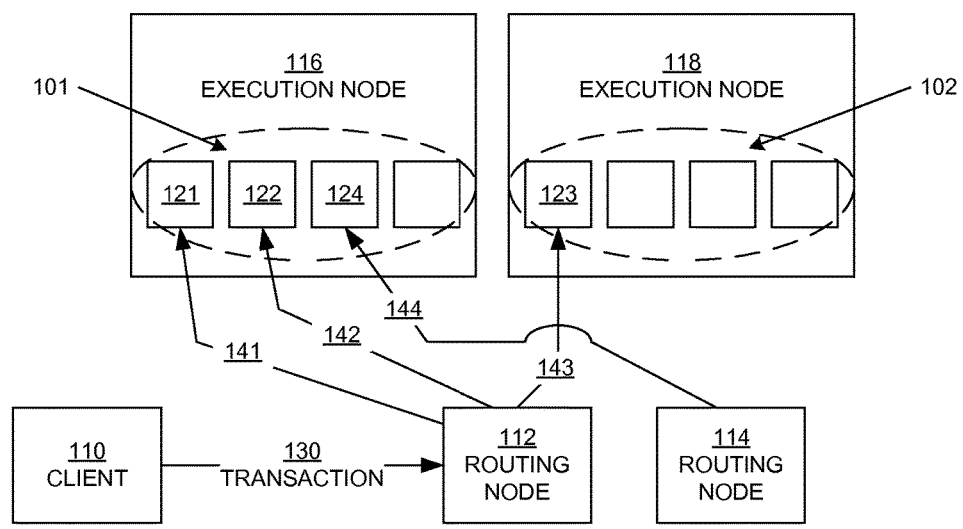
FIG. 1 is a block diagram illustrating an example of action-based routing of a transaction in an online transaction processing system in an embodiment according to the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "determining," "separating," "routing," "performing," "initiating", "instructing," "delegating," "enqueuing," "sending," "receiving," "dividing," "locking," "notifying," "communicating," "defining," or the like, refer to actions and processes (e.g., the flowchart 700 of FIG. 7) of a computing system or similar electronic computing device or processor (e.g., the node 810 of FIG. 8). The computing system or similar electronic computing device manipulates and transforms data represented as physical (electronic) quantities within the computing system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram illustrating an example of action-based routing of a transaction in an online transaction processing (OLTP) system 100 in an embodiment according to the present invention. In general, the OLTP system 100 stores and maintains a database of transactional data.

The example system of FIG. 1 includes a client device 110 and a number of nodes, referred to herein as a first routing node 112, a second routing node 114, a first execution node 116, and a second execution node 118. An OLTP system can include additional clients and nodes, as well as elements other than those shown and described. The nodes may be collectively known as a cluster. Nodes can be interconnected using connections based on, for example, Ethernet, Infiniband, or PCI/e (Peripheral Component Interconnect Express). Each node can be identified using a unique node identifier (ID).

The OLTP system 100 can be characterized as a share-nothing distributed OLTP system in which a node is a multi-threaded system with its own persistent memory. In its most basic configuration, a node includes a processor, a memory, and a mechanism for communicating with other nodes (see FIG. 8). A node can be a device such as a computing system or a server. A node can also be an element that is implemented on a device such as a computing system or server along with other nodes; that is, multiple nodes can be implemented on a single device. A node can also be implemented as a virtual machine.

With reference to FIG. 1, the routing nodes 112 and 114 are nodes that can make connections with and accept transactions (e.g., the transaction 130) from the client device 110, and can route transactions to the execution nodes 116 and 118. More specifically, in embodiments according to the present invention, the routing nodes route actions derived from the transactions, as will be more fully described below. An action may also be known as a statement or command.

The execution nodes 116 and 118 are nodes that can execute actions received from the routing nodes 112 and 114. The execution nodes 116 and 118 execute those actions on the respective portions of the database that they store and maintain. That is, the execution node 116 can store and maintain a first portion of a database and can perform actions on the first portion, and the execution node can store and maintain a second portion of the database and can perform actions on the second portion. A routing node may be an execution node, and an execution node can also function as a routing node.

More specifically, a database management system (DBMS) or a distributed DBMS (DDBMS) can partition a database across the cluster of execution nodes in the OLTP system 100. That is, a database stored and maintained by the OLTP system is physically divided into "data partitions," and each data partition is stored on a respective execution node. An execution node can store more than one data partition of the database. In the example of FIG. 1, the partition 101 includes data stored on the execution node 116, and the partition 102 includes data stored on the execution node 118. In an embodiment, the data partitions are disjoint sets of data.

In an embodiment, the database is arranged as tables, each table having one or more rows. In such an embodiment, the tables may be physically partitioned across the cluster of execution nodes, and each partition can be identified by a partition number or partition ID. Thus, a first partition of one or more table rows may be stored together on one of the execution nodes, a second partition of one or more table rows (not including any rows from the first group) may be stored on another one of the execution nodes, and so on. Each partition of one or more table rows that is stored together may be referred to as a table partition. In such an embodiment, a table partition may be logically divided into one or more table segments; a table segment is a set of table rows in a table partition that are logically owned (e.g., locked) by a thread.

Figure 2:
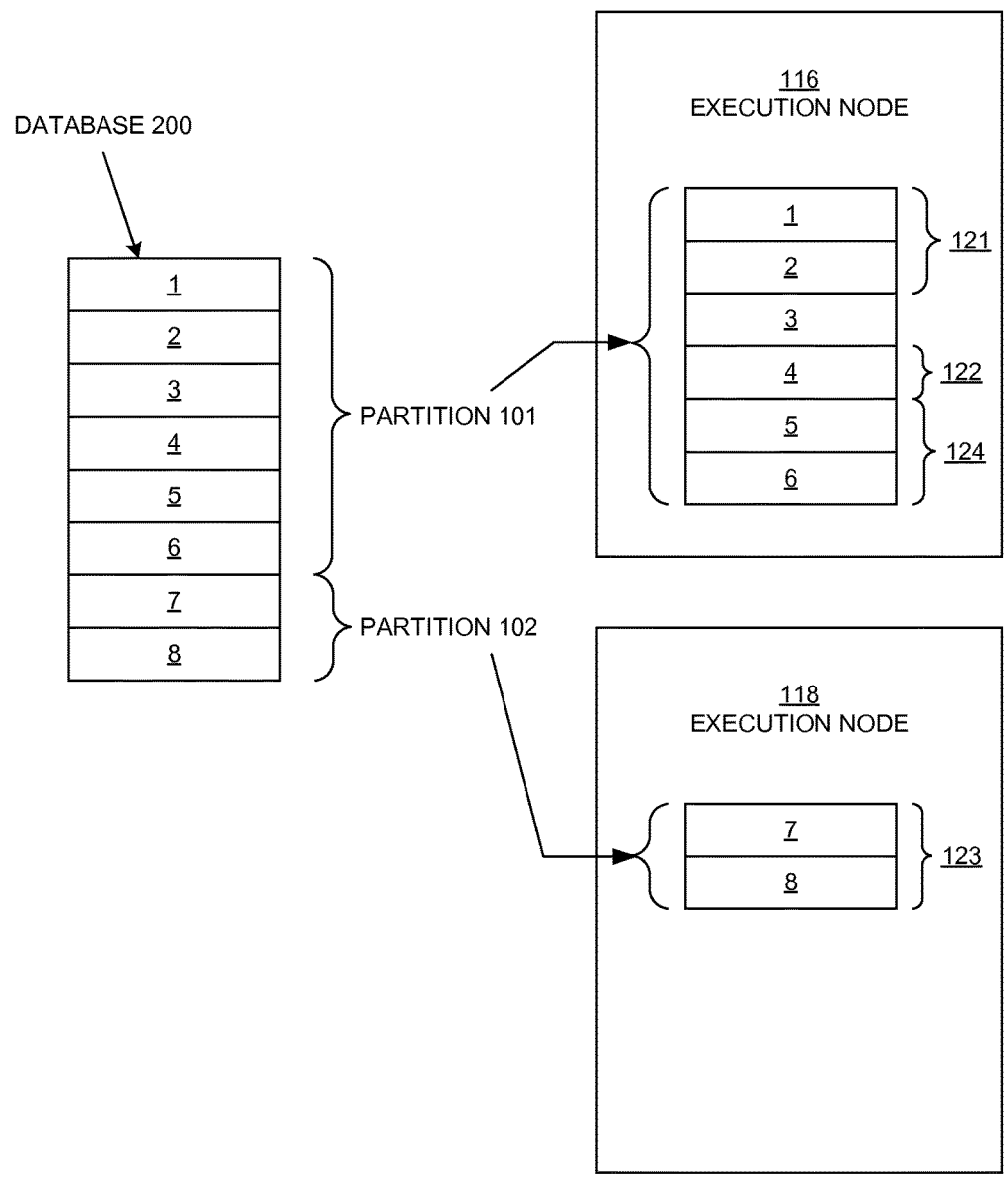
FIG. 2 is a block diagram illustrating an example of data partitioning in an embodiment according to the present invention.

FIG. 2 is a block diagram illustrating an example of data partitioning in an embodiment according to the present invention. In the example of FIG. 2, the database 200 logically includes a number of table rows 1-8. In this example, rows 1-6 constitute the partition 101, and rows 7 and 8 constitute the partition 102. The partition 101 is physically stored on the first execution node 116, and the partition 102 is physically stored on the second execution node 118.

In an embodiment, the routing nodes (e.g., the routing node 112) include a table that maps data (e.g., a table partition) to the execution node on which the set of data is stored. Following is an example of a mapping table on the routing node 112 in the example of FIG. 2, which maps partition to node (e.g., partition number/ID to node ID) and also maps rows to partition (row number to partition number/ID).

| Rows | Partition | Node |
|------|-----------|------|
| 1-6  | 101       | 116  |
| 7-8  | 102       | 118  |

With reference back to FIG. 1, the transaction 130 can be separated into one or more actions. In general, an action is an activity that can be performed independently of the other actions associated with a transaction. At least two types of actions are associated with a transaction: actions performed on the data, and synchronization actions. Other types of actions may be associated with a transaction, such as transaction management operations.

Actions performed on the data include actions that add data to, delete data from, or change (update) data in an OLTP database. More specifically, these types of actions modify (e.g., add, delete, update) a portion of a database, such as a table segment. An action may also be known as a statement, query, expression, or command. For simplicity of discussion, these types of actions will be referred to herein as data actions. In an embodiment, a data action is a DML (Data Manipulation Language) action (an action that is specified using the DML syntax). For example, an update data action may be of the form UPDATE table_name SET column_name=value [, column_name=value . . . ] [WHERE condition]; in this example, the values of column "column_name" in table "table_name" will be set to "value," but only in those rows where "condition" is satisfied. The actions 141, 142, 143, and 144 of FIG. 1 are examples of data actions.

A synchronization action serves as a synchronization point that is performed one or more times during the course of a transaction. A synchronization action essentially divides a transaction into multiple steps or time frames (see FIG. 3). Within each step or time frame, multiple data actions can be executed in parallel. In essence, if there is a data dependency between two data actions, then those data actions are separated by a synchronization actions; a synchronization action separates two data actions that depend on the same data so that the transaction is executed in steps. The next step of a transaction is not started until the data actions of the previous step are completed.

The last synchronization action associated with a transaction includes a commit operation, specifically a two-phase commit operation, to commit the transaction results (additions, deletions, changes) to the OLTP database.

The manner in which the routing node 112 transforms a transaction (e.g., the transaction 130) into data actions is now described with reference to FIGS. 1 and 2. In general, the routing node 112 defines a data action according to the location of the data that the action will act on.

In an embodiment, the transaction 130 includes information that identifies the sets of data (e.g., data partitions or segments) that the transaction is to modify (add, delete, or change). As mentioned above, the routing node 112 includes a mapping table that identifies where data is stored. Accordingly, the routing node 112 can define a data action for each entry in the mapping table that is to be modified by the transaction. In an embodiment, the routing node 112 can define a data action based on the logical partition number/ID associated with the data to be acted on by the data action.

Because the actions in a transaction are defined according to where the data resides, the transaction may be performed on different execution nodes. Thus, some parts of the transaction 130 may be performed on one execution node, other parts on another execution node, and so on.

For example, the transaction 130 may act on a first set of data 121 and a second set of data 122, which are stored on the execution node 116, and also may act on a third set of data 123, which is stored on the execution node 118. In an embodiment, the transaction 130 includes information that identifies the partition ID for each set of data to be acted on (e.g., a first partition ID for the first set of data 121, a second partition ID for the second set of data 122, and so on). Accordingly, the routing node 112 separates the transaction 130 into: a first data action 141, corresponding to the first set of data 121 (e.g., corresponding to the first partition ID); a second data action 142, corresponding to the second set of data 122 (e.g., corresponding to the second partition ID); and a third data action 143, corresponding to the third set of data 123 (e.g., corresponding to a third partition ID). In an embodiment in which the database 200 is arranged as tables, each of the sets of data 121, 122, and 123 corresponds to a table segment within a table partition (the table partition identified by the corresponding partition ID).

In general, a data action can be defined for each set of data (e.g., table segment) that is acted on by the transaction. Because the actions in a transaction are defined according to where the data resides, the transaction may be performed on different execution nodes. Thus, some parts of the transaction 130 may be performed on one execution node, other parts of the transaction may be performed on another execution node, and so on.

Each data action is then communicated (routed) to the execution node that stores the data that the action is to act on. Thus, in the example of FIG. 1, the data actions 141 and 142 are routed to the first execution node 116, and the data action 143 is routed to the second execution node 118.

The actions are then performed by the execution nodes to which they were routed. In the example of FIG. 1, the first execution node 116 performs the data action 141 on the first set of data 121 and the data action 142 on the second set of data 122, and the second execution node 118 performs the data action 143 on the third set of data 123.

In the example above, a single data action that operates on both sets of data 121 and 122 on the execution node 116 could be defined.

Figure 3:
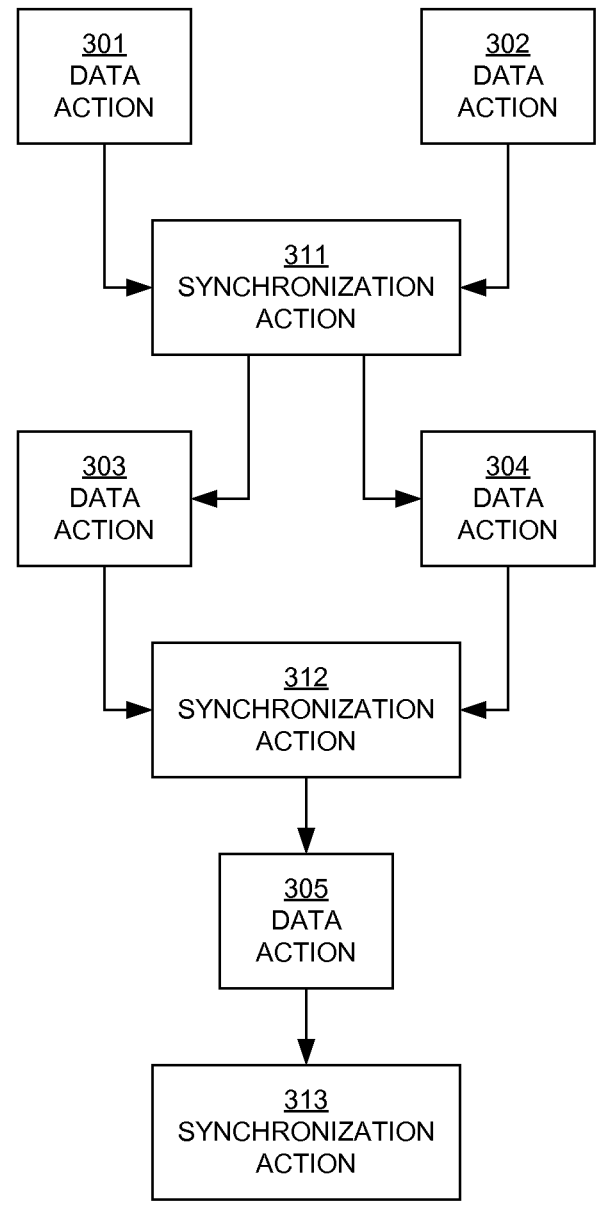
FIG. 3 illustrates an example of a transaction that has been transformed into data actions and synchronization actions in an embodiment according to the present invention.

FIG. 3 illustrates an example of a transaction 330 (analogous to the transaction 130 of FIG. 1) that has been transformed into data actions and synchronization actions in an embodiment according to the present invention. In an embodiment, a routing node (e.g., the routing node 112 of FIG. 1) receives the transaction 330 from the client 110, and transforms the transaction into a number of data actions (e.g., DML actions) and synchronization actions. The manner in which the routing node 112 transforms a transaction into data and synchronization actions is discussed further below.

In the example of FIG. 3, the transaction 330 includes data actions 301, 302, 303, 304, and 305, and also includes synchronization actions 311, 312, and 313. The synchronization actions essentially divide the transaction 330 into multiple steps, each step including one or more data actions. The data actions in each step are performed in parallel with one another; that is, they may or may not be performed at the same time, but they are performed within the same time frame, on the same or on different execution nodes.

Thus, in the example of FIG. 3, the data actions 301 and 302 are performed in parallel with one another. The data actions 301 and 302 may be performed on the same execution node, or they may be performed on different execution nodes, depending on where the data they are to act on resides. The routing node 112 is notified once the data actions 301 and 302 are completed, and then the synchronization action 311 is executed. Once the synchronization action 311 is completed, the data actions 303 and 304 are performed. The routing node 112 is notified once the data actions 303 and 304 are completed, the synchronization action 312 is then executed, and then the data action 305 is performed. The routing node 112 is notified once the data action 305 is completed, and the synchronization action 313 is then performed. In the example of FIG. 3, the synchronization action 313 is the last action, and therefore includes a commit operation, specifically a two-phase commit operation, to commit the results of the transaction 330 to the OLTP database.

Figure 4:
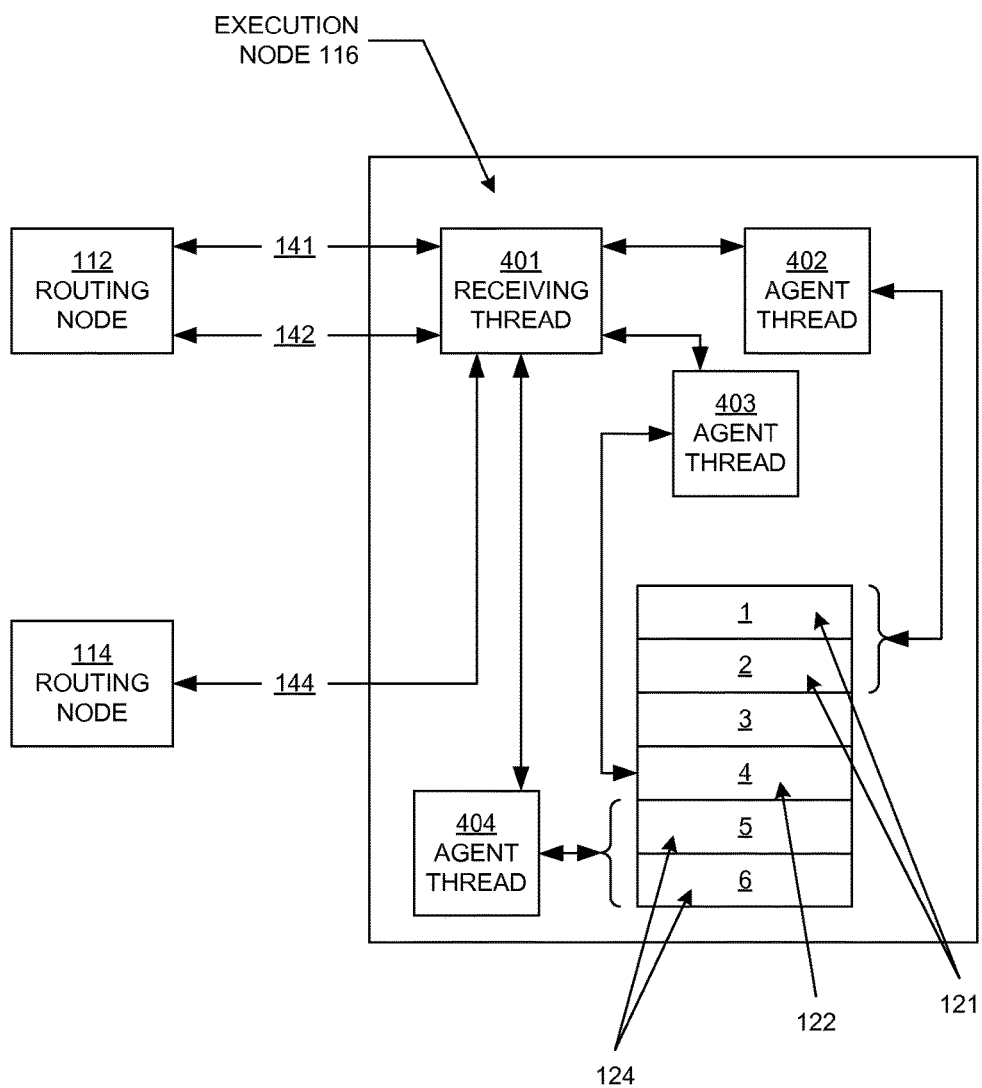
FIG. 4 illustrates an example of data actions executing on a node in an embodiment according to the present invention.

FIG. 4 illustrates an example of data actions executing on an execution node in an embodiment according to the present invention. In the example of FIG. 4, the routing node 112 communicates the data actions 141 and 142 to the execution node 116.

In an embodiment, each data action communicated to an execution node is received by a first thread (referred to herein as a "receiving thread") that is executing on that execution node, which in turn delegates that data action to a respective action-specific second thread (referred to herein as an "agent thread"). A different agent thread is associated with each data action.

For example, the data action 141 is communicated to the receiving thread 401 that executes on the execution node 116. The receiving thread 401 delegates the data action 141 to an action-specific second thread 402 (an agent thread) that executes on the same execution node. The agent thread 402 enqueues the data action 141, and can send a message to the receiving thread 401 when that data action is enqueued. The agent thread 402 can also request and invoke a lock on the set of data 121 (e.g., the table segment consisting of rows 1 and 2) to be acted on by the data action 141; that is, the set of data 121 is logically owned by the agent thread 402. While a row of data is locked, it cannot be acted on by another thread. The agent thread 402 then modifies the set of data 121 (e.g., it adds, deletes, or changes the data) according to the data action 141. When the agent thread 402 is done with the set of data 121, it can unlock that data. The agent thread 402 can also notify the receiving thread 401 when the data action 141 is completed by sending a message to the receiving thread, which in turn can notify the routing node 112.

Similarly, the data action 142 is communicated to the receiving thread 401. The receiving thread 401 delegates the data action 142 to another (second) agent thread 403 that executes on the same execution node. The second agent thread 403 enqueues the data action 142, and can send a message to the receiving thread 401 when the data action 142 is enqueued. The second agent thread 403 can also request and invoke a lock on the set of data 122 (e.g., the table segment consisting of row 4) to be acted on by the data action 142. The second agent thread 403 can notify the receiving thread 401 when the data action 142 is completed by sending a message to the receiving thread, which in turn can notify the routing node 112.

In this manner, the execution node 116 can perform the data actions 141 and 142 in parallel.

While the execution node 116 is executing the data actions 141 and 142 from the routing node 112, it can also execute one or more other data actions from the routing node 112 that are associated with a transaction other than the transaction 130. Also, the execution node 116 can execute one or more data actions for one or more transactions received from one or more other routing nodes. For example, the receiving thread 401 can receive the data action 144 from the routing node 114 and delegate that data action to an action-specific agent thread 404 that can send a message to the receiving thread 401 when the data action 144 is enqueued. The agent thread 404 can invoke a lock on the set of data 124 (e.g., the table segment consisting of rows 5 and 6) to be acted on by the data action 144 and can notify the receiving thread 401 when the data action 144 is completed, which in turn can notify the routing node 114.

In a similar manner, a receiving thread executing on the execution node 118 can receive the data action 143 from the routing node 112, delegate that data action to an action-specific agent thread, and send a message to the receiving thread executing on that execution node when the data action 143 is enqueued. That agent thread can invoke a lock on the set of data 123 and can notify the receiving thread on the execution node 118 when the data action 143 is completed, which in turn can notify the routing node 112.

In an embodiment, the execution nodes include a table that maps a set of data (table segment or row) to its owner thread using a thread ID. Following is an example of a row-by-row mapping table on the execution node 116 in the example of FIG. 4.

| Row | Thread ID |
|-----|-----------|
| 1 | 402 |
| 2 | 402 |
| 3 | — |
| 4 | 403 |
| 5 | 404 |
| 6 | 404 |

The use of agent threads in addition to a receiving thread improves performance by reducing latency. For example, if the receiving thread performed the tasks that are delegated to the agent thread (e.g., the tasks of enqueuing a data action, requesting and invoking locks, and acting on the data), then the receiving thread would be busy during the time it took to perform those tasks and would thus not be able to receive another data action, causing data actions to back up at the execution nodes. In other words, with the use of agent threads, the receiving thread can continue to receive data actions from the routing nodes while the agent threads execute the data actions.

Figures 5, 6:
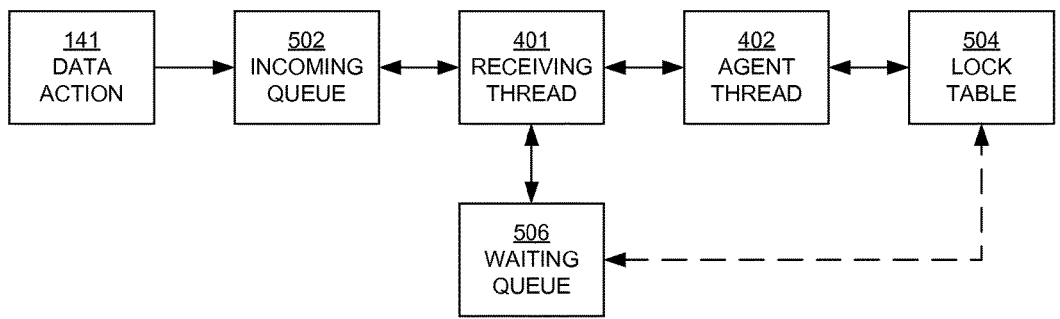
FIG. 5 is a block diagram illustrating the processing of a data action on a node in an embodiment according to the present invention.
FIG. 6 is an example of a format of a message that can be used to communicate actions to a node in an embodiment according to the present invention.

FIG. 5 is a block diagram illustrating the processing of a data action (e.g., the data action 141) on an execution node (e.g., the execution node 116) in an embodiment according to the present invention. The data action 141 is added to an incoming queue 502 (e.g., a first-in first-out (FIFO) buffer). In turn, the receiving thread 401 delegates the data action 141 to an action-specific agent thread 402. The agent thread 402 can access a local lock table 504 (such as the mapping table described above) to determine whether the set of data that is to be acted on by the data action 141 is locked (e.g., by another agent thread that is executing another data action that is acting on the same set of data to be acted on by the data action 141). If the data to be acted on by the data action 141 is locked, then that data action is added to a waiting queue 506 (e.g., a FIFO buffer) until that data is unlocked. When the data to be acted on by the data action 141 is unlocked, then that data action can be performed by the agent thread 402 as described above.

Other data actions are handled in a similar manner. That is, they are added to the incoming queue 502, delegated to a respective agent thread in turn, added to the waiting queue 506 if necessary, and executed.

FIG. 6 is an example of a format of an action-specific message 600 that can be used by a routing node to communicate actions to an execution node in an embodiment according to the present invention. As described above, a transaction can be divided into separate actions, and the message 600 is specific to one of those actions. In the FIG. 6 embodiment, the message 600 includes a time stamp and a message sequence ID that are inserted by the routing node. The sender node ID field includes information that identifies the routing node. The sender thread name/ID field identifies the specific action. The receiver node ID identifies the execution node to which the action is being routed. In an embodiment, these fields have fixed lengths (they are at fixed offsets within the message), which facilitates routing of the messages.

The message 600 also identifies the message type—the type of action to be performed. The types of message include, but are not limited to: messages that send data actions to the execution node; and messages that request the execution nodes to commit. Messages can have different lengths according to the type of message, and the message field length identifies the length of the message. The message field includes the message itself. The end of message field is used to indicate the end of the message.

In general, in an embodiment according to the present invention, instead of sending an entire action, the action is parameterized as described above and the parameterized information is included in an action-specific message such as the message 600. The parameterized information is enough to allow the action to be reconstructed by the execution node that receives the message. Consequently, the amount of data that is sent from the routing node to the execution nodes is reduced, thereby reducing overhead and network traffic and increasing bandwidth.

Figure 7:
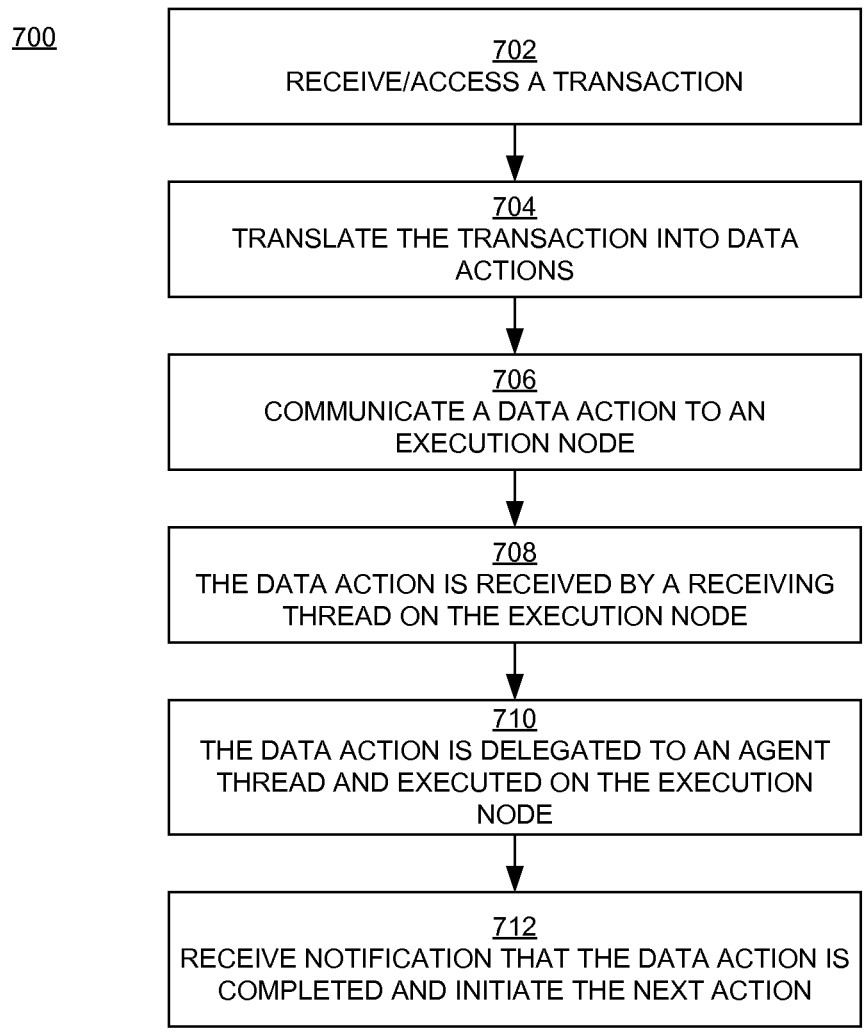
FIG. 7 is a flowchart illustrating an example of a computer-implemented method of action-based routing of a transaction in an embodiment according to the present invention.

FIG. 7 is a flowchart 700 illustrating an example of a computer-implemented method of action-based routing of a transaction in an embodiment according to the present invention. FIG. 7 is discussed in conjunction with FIGS. 1-4. All or some of the operations represented by the blocks in the flowchart 700 can be implemented as computer-executable instructions residing on some form of non-transitory computer-readable storage medium. In the flowchart 700, some of the operations (e.g., blocks 702, 704, 706, and 712) can be executed on a routing node (e.g., the routing nodes 112 and 114), and other operations (e.g., blocks 708 and 710) can be executed on an execution node (e.g., the execution nodes 116 and 118).

In block 702, a transaction (e.g., the transaction 130) is received at, or accessed by, a routing node (e.g., the routing node 112).

In block 704, the routing node translates the transaction into data actions as previously described herein. Generally speaking, the routing node determines which sets of data in the database the transaction is to act on, and the transaction is then separated into data actions according to the data dependencies of the transaction.

In block 706, a data action (e.g., the data action 141) is communicated (routed) to the execution node (e.g., the execution node 116) that stores the data to be acted on by the data action. In general, each data action is routed to the execution node that stores the data to be acted on by that data action. In an embodiment, each data action is communicated to an execution node using a respective action-specific message (e.g., the message 600 of FIG. 6).

In block 708 of FIG. 7, in an embodiment, a data action is received by a first thread (a receiving thread) that executes on the execution node to which the data action has been routed. For example, the data action 141 is received by a receiving thread 401 that executes on the first execution node 116.

In block 710, in an embodiment, the receiving thread delegates the data action 141 to an action-specific second thread (the agent thread 402) that executes on the same execution node. As mentioned above, in an embodiment, the agent thread 402 enqueues the data action, sends a message to the receiving thread 401 when the data action is enqueued, requests and invokes a lock or locks on the data to be acted on by the data action, and notifies the receiving thread when the data action is completed by sending a message to the receiving thread, which in turn notifies the routing node 112.

In general, each execution node performing a data action as part of the transaction notifies the routing node when the data action is completed.

In block 712, in response to being notified that the current set of data actions have been completed, the routing node can initiate the next (following) action or set of actions associated with the transaction. The next action can be, for example, a synchronization action to synchronize the actions just completed, or it can be another action (e.g., another DML action) that acts on the database in the OLTP system. Once all actions associated with the transaction have been completed, a commit operation (e.g., a two-phase commit instructing the execution nodes to commit completed data actions to the database) can be performed.

Embodiments according to the present invention thus utilize a data-oriented transaction processing model to increase OLTP throughput using intra-transaction parallelism along with inter-transaction parallelism. The probability of conflicts can be reduced, and global locking that is commonly a bottleneck in high-throughput OLTP systems can be avoided. Instruction-data locality, the ability to profile system performance, and system scalability are improved. Action-based routing reduces the overhead associated with database queries (e.g., SQL statements) and their execution, thus decreasing network traffic and increasing network bandwidth.

Figure 8:
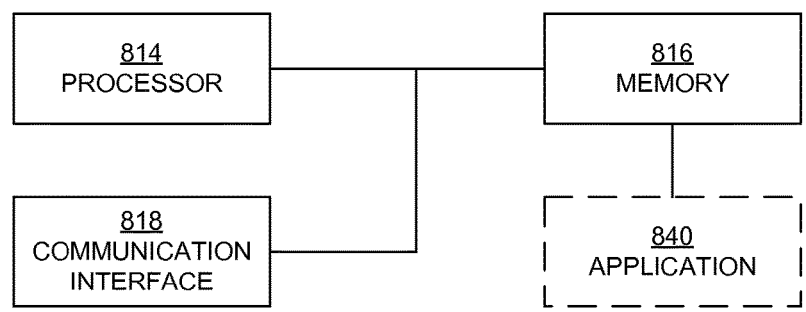
FIG. 8 is a block diagram of an example of a node capable of implementing embodiments according to the present invention.

FIG. 8 is a block diagram of an example of a node 810 capable of implementing embodiments according to the present invention. The node 810 broadly includes any single or multi-processor computing device or system capable of executing computer-readable instructions, such as those described in conjunction with FIG. 7. In its most basic configuration, the node 810 may include at least one processing circuit (e.g., the processor 814) and at least one non-volatile storage medium (e.g., the memory 816).

The processor 814 generally represents any type or form of processing unit or circuit capable of processing data or interpreting and executing instructions. In certain embodiments, the processor 814 may receive instructions from a software application or module. These instructions may cause the processor 814 to perform the functions of one or more of the example embodiments described and/or illustrated herein.

The system memory 816 generally represents any type or form of volatile or non-volatile storage device or medium capable of storing data and/or other computer-readable instructions. Examples of system memory 816 include, without limitation, RAM, ROM, flash memory, or any other suitable memory device. Although not required, in certain embodiments the node 810 may include a volatile memory unit in addition to a non-volatile storage unit.

The node 810 may also include one or more components or elements in addition to the processor 814 and the system memory 816. For example, the node 810 may include a memory controller, an input/output (I/O) controller, and a communication interface 818, each of which may be interconnected via a communication infrastructure.

The communication interface broadly represents any type or form of communication device or adapter capable of facilitating communication between the node 810 and one or more additional nodes using connections based on, for example, Ethernet, Infiniband, and PCI/e.

The node 810 can execute an application 840 that allows it to perform operations (e.g., the operations of FIG. 7). A computer program containing the application 840 may be loaded into the node 810. For example, all or a portion of the computer program stored on a computer-readable medium may be stored in the memory 816. When executed by the processor 814, the computer program can cause the processor to perform and/or be a means for performing the functions of the example embodiments described and/or illustrated herein. Additionally or alternatively, the example embodiments described and/or illustrated herein may be implemented in firmware and/or hardware.

Many other devices or subsystems may be connected to the node 810. The node 810 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method performed by a node in an online transaction processing (OLTP) system, the node comprising a processor and memory, the method executed by the processor and comprising:
   receiving, at the node, a request from a client to perform a transaction on a database in the OLTP system, the transaction comprising information that identifies a plurality of sets of data that the transaction is to act on, the information identifying first and second sets of data stored on a first node of the OLTP system and a third set of data that is stored on a second node of the OLTP system;
   defining actions that are parts of the transaction, the actions defined depending on which nodes in the OLTP system store the data that is to be acted on by the transaction, the actions comprising a first action associated with the first set of data, a second action associated with the second set of data and a third action associated with the third set of data;
   communicating the first and second actions to the first node, including sending respective first and second action-specific messages for the first and second actions, respectively, to a first receiving thread that, when executed on the first node, delegates the first action to a first thread agent that, when executed on the first node, performs the first action on the first set of data, and delegates the second action to a second thread agent that, when executed on the first node, performs the second action on the second set of data;
   communicating the third action to the second node, including sending a third action-specific message for the third action to a second receiving thread that, when executed on the second node, delegates the third action to a third thread agent that, when executed on the second node, performs the third action on the third set of data;
   wherein:
   the first and second nodes are operable for performing the first, second, and third actions in parallel, and
   the first node is operable for executing the first and second thread agents in parallel.

2. The method of claim 1, wherein the database is logically and physically partitioned into partitions, each of the partitions comprising one or more rows of data, wherein a set of the data in the database comprises one or more of rows of a partition, and wherein the method further comprises:
   identifying partition identifiers (IDs) for partitions in the database to be acted on by the transaction;
   accessing a mapping of the partition IDs to nodes on which the partitions are stored; and
   separating the transaction into the actions including the first action, the second action, and the third action based on the partition IDs and the nodes on which the partitions are stored.

3. The method of claim 1, wherein the first thread agent enqueues the first action and sends a message to the first receiving thread when the first action is enqueued, and wherein the second thread agent enqueues the second action and sends a message to the first receiving thread when the second action is enqueued.

4. The method of claim 1, wherein the first thread agent invokes a lock on the first set of data before performing the first action and sends a message to the first receiving thread when the first action is completed, and wherein the second thread agent invokes a lock on the second set of data before performing the second action and sends a message to the first receiving thread when the second action is completed.

5. The method of claim 1, further comprising receiving notifications from both the first and second nodes that the first, second, and third actions are completed.

6. The method of claim 5, further comprising, in response to receiving the notifications, instructing the first and second nodes to commit results of the first, second, and third actions, respectively to the database.

7. The method of claim 5, further comprising, in response to receiving the notifications, communicating a fourth action of the transaction to a node that stores a set of the data to be acted on by the fourth action.

8. A node in an online transaction processing (OLTP) system, the node comprising:
a processing circuit; and
memory coupled to the processing circuit and having stored therein instructions that, when executed, cause the node to perform a method comprising:
receiving, at the node, a transaction that is to be performed on a database that is physically partitioned into sets of data that are stored on a plurality of nodes in the OLTP system;
determining which of the sets of data the transaction is to act on based on partition numbers identified by the transaction, wherein said determining identifies a first set of data and a second set of data of the sets of data, the first and second sets of data stored on a first node of the plurality of nodes, and a third set of data of the sets of data that is stored on a second node of the plurality of nodes;
separating the transaction into actions according to which of the sets of data the transaction is to act on and which of the nodes in the OLTP system store the sets of data the transaction is to act on, the actions comprising a first action, a second action, and a third action the first and second actions mapped to the first and second sets of data, respectively, and the third action mapped to the third set of data;
communicating the first and second actions to the first node, including sending first and second action-specific messages comprising information describing the first and second actions to a first receiving thread executing on the first node to delegate the first action to a first thread agent and to delegate the second action to a second thread agent that execute on the first node to perform the first and second actions on the first and second sets of data, respectively;
communicating the third action to the second node, including sending a third action-specific message comprising information describing the third action to a second receiving thread executing on the second node to delegate the third action to a third thread agent that executes on the second node to perform the third action on the third set of data,
receiving notifications from the first and second nodes that the first, second, and third actions are completed; and
in response to the notifications, initiating a next action of the transaction that follows the first, second, and third actions,
wherein:
the first and second nodes are operable for performing the first, second, and third actions in parallel, and
the first node is operable for executing the first and second thread agents in parallel.

9. The node of claim 8, wherein the method performed by the node further comprises:
accessing information that maps the partition numbers identified by the transaction to nodes on which the sets of data are stored; and
separating the transaction into the actions including the first action, the second action, and the third action based on the partition numbers associated with the sets of data.

10. The node of claim 8, wherein the method performed by the node further comprises first thread agent enqueuing the first action, sending a message to the first receiving thread when the first action is enqueued, invoking a lock on the first set of data before performing the first action, and sending a message to the first receiving thread when the first action is completed; and wherein the second thread agent enqueues the second action, sends a message to the first receiving thread when the second action is enqueued, invokes a lock on the second set of data before performing the second action, and sends a message to the first receiving thread when the second action is completed.

11. The node of claim 8, wherein initiating the next action comprises instructing the first and second nodes to commit results of the first, second, and third actions, respectively to the database.

12. The node of claim 8, wherein initiating the next action comprises routing a fourth action of the transaction to a node of the plurality of nodes that stores a set of the data to be acted on by the fourth action.

13. A non-transitory computer-readable storage medium having computer-executable instructions that, when executed, cause a routing node in an online transaction processing (OLTP) system to perform a method, the method comprising:
accessing a transaction that is to be performed on a database in the OLTP system, the database physically and logically partitioned into a plurality of sets of data that are stored on a plurality of execution nodes;
separating the transaction into a plurality of actions according to which of the sets of data include data to be acted on by the transaction and according to which of the plurality of execution nodes store the data to be acted on by the transaction, wherein each action of the plurality of actions is associated with a respective one of the sets of data stored on the plurality of execution nodes;
for each action of the plurality of actions, sending an action-specific message to a respective receiving thread on a respective execution node of the plurality of execution nodes, the respective execution node storing the set of data associated with the action, wherein the respective receiving thread is configured to delegate multiple actions to multiple respective execution threads on the respective execution node wherein the respective execution threads are configured to perform the multiple actions in parallel on the respective execution node and the plurality of execution nodes are configured to run in parallel; and
in response to receiving notification indicating that the plurality of actions is complete, initiating another action associated with the transaction.

14. The computer-readable storage medium of claim 13, wherein the method further comprises:
identifying partition identifiers (IDs) for partitions of data to be acted on by the transaction;
accessing a mapping of the partition IDs to execution nodes on which the partitions are stored; and
separating the transaction into the plurality of actions based on the partition IDs and the execution nodes on which the partitions of data to be acted on by the transaction are stored.

15. The computer-readable storage medium of claim 13, wherein the instructions configure each respective execution thread to enqueue the action and to send a message to the respective receiving thread when the action is enqueued.

16. The computer-readable storage medium of claim 15, wherein the instructions configure each respective execution thread to invoke a lock on the set of data stored on the respective execution node before performing the action, and to send a message to the respective receiving thread when the action is completed.

17. The computer-readable storage medium of claim 13, wherein said initiating the other action comprises instructing the execution node to commit results of the plurality of actions to the database.

18. The computer-readable storage medium of claim 13, wherein said initiating the other action comprises routing the other action of the transaction to an execution node that stores a set of the data to be acted on by the other action.

* * * * *